United States Patent [19]

Lee et al.

[11] 4,092,601
[45] May 30, 1978

[54] CODE TRACKING SIGNAL PROCESSING SYSTEM

[75] Inventors: William H. Lee, Boston; Duncan B. Cox, Jr., Manchester, both of Mass.

[73] Assignee: The Charles Stark Draper Laboratory, Inc., Cambridge, Mass.

[21] Appl. No.: 691,581

[22] Filed: Jun. 1, 1976

[51] Int. Cl.$^2$ .............................................. H04L 7/04
[52] U.S. Cl. .................................................. 325/322
[58] Field of Search .................. 325/40, 42, 321, 322, 325/323, 324, 473, 474, 475, 476; 328/133, 134, 155; 333/17; 178/88, 69.1

[56] References Cited

U.S. PATENT DOCUMENTS

| | | | |
|---|---|---|---|
| 3,305,636 | 2/1967 | Webb ................................. | 325/47 X |
| 3,626,298 | 12/1971 | Paine ................................... | 325/321 |
| 3,665,472 | 5/1972 | Kartchner et al. ................... | 343/175 |
| 3,741,655 | 6/1973 | Ling et al. ............................ | 325/323 |
| 3,938,052 | 2/1976 | Glasson et al. ...................... | 178/88 X |

*Primary Examiner*—Benedict V. Safourek
*Attorney, Agent, or Firm*—Robert F. O'Connell

[57] ABSTRACT

A code tracking signal processing system for tracking a coded signal of the pseudo-random-noise, or PRN, type wherein a time shift comparison is made of the input coded signal and a pair of time estimated coded feedback signals which represent an estimate of the coded input signal which has been advanced and delayed, respectively, by the same specified time shift. An effective error signal is formed from the time shift comparison signals and supplied to a digital integration means, such as an up-down counter, to generate a pair of control signals. The control signals control the pulse rate of a pulsed clock signal in accordance with the time shift error between the estimated code signal and the input code signal. The controlled pulse rate signal is then used to generate the advanced and delayed feedback signals and to produce a coded signal which is in effect locked into time synchronism with the input coded signal.

15 Claims, 5 Drawing Figures

4,092,601

CODE TRACKING SIGNAL PROCESSING SYSTEM

INTRODUCTION

This invention relates generally to a system for tracking the time shifts of two-state coded signal waveforms and, more particularly, to the use of digital delay-locked-loop techniques for performing such tracking.

BACKGROUND OF THE INVENTION

In modern communications systems and radio ranging systems pseudo-random-noise (PRN) codes are often employed. These are waveforms which oscillate almost randomly between two states, with transitions occurring in synchronism with the transitions of a square wave. In communication systems the information-carrying signal is modulated by a PRN code before transmission to the receiver. The receiver utilizes a replica of the code in a demodulation process to recover the information-carrying signal. This process requires that the replica code be synchronized in time with the received code modulation. In radio-ranging systems a code-modulated waveform is transmitted, and the receiver measures the time delay in propagation from the transmitter to the receiver. The time delay is measured by synchronizing the timing of a replica code with that of the received code modulation and measuring the resulting time shift of the replica code with respect to a reference clock.

Use of the PRN codes in such systems offers several advantages. Thus, it provides a convenient method of multiplexing, i.e., using one communication channel for the transmission of several signals by utilizing a unique code for each signal. Moreover, it provides a degree of security by preventing those without knowledge of the code from receiving the communication or ranging information. Further, it provides a degree of protection from jamming and spoofing by allowing the receiver to distinguish the transmitted code-modulated waveforms from jamming signals that are not modulated by the code. Such codes also provide a degree of protection from multipath interference by allowing the multipath signals to be distinguished as arriving later than the directly received signals.

These and other advantages are well known and are described, for example, in such publications and text books as "Spread Spectrum Communications", AGARD Lecture Services No. 58, North Atlantic Treaty Organization, Advisory Group for Aerospace Research and Development, May-June, 1975, National Technical Information Service Report AD-766 914; "Synchronization Systems in Communication and Control", William C. Lindsey, Prentice-Hall Inc., Englewood Cliffs, N.J., 1972; and "Telecommunications Systems Engineering", W. C. Lindsey and M. K. Simon, Prentice-Hall, Inc., Englewood Cliffs, N.J., 1973.

A key process in the operation of the aforementioned systems incorporating PRN modulated waveforms is the time synchronization of the replica code at the receiver with the code modulations of the incoming signal. This is often accomplished by means of a delay-locked-loop using analog techniques, as described in the above texts. The delay-locked-loop allows the replica code to be synchronized with the received code in the presence of strong interference from background noise, jamming signals, or signals being multiplexed with other codes.

Several problems arise in such known and conventional implementations of delay-locked loops. First, such loops use analog switches which are expensive to implement with adequate speed and accuracy. Secondly, the analog summation network and loop-filter network used therein are expensive to implement with adequate long-term stability under typical environmental perturbations such as vibration, shock, changes in power supply parameters, changes in temperature, or changes in humidity. Thirdly, they require the use of a voltage-controlled oscillator which is expensive to implement with adequate frequency stability under the aforementioned environmental perturbations. These problems are particularly severe when long loop response times are desired in severe environments.

BRIEF SUMMARY OF THE INVENTION

The present invention overcomes the problems associated with prior systems and provides a relatively simple, low-cost, digital delay-locked loop by appropriately exploiting the timing information in the zero crossings of the received coded waveforms and thereby avoiding the necessity of utilizing analog circuitry to process the amplitude information. In any application where, because of distortions due to the transmission medium, the received coded waveform does not have sharply defined zero crossings, a zero-crossing detector (e.g. a hard limiter) can be employed, the output of which is a two-state PRN coded waveform with sharply defined transition times.

In accordance with an embodiment of the invention a two-state coded signal waveform is supplied as the input to two separate time shift comparison means. One of the time shift comparison means is also supplied with a first feedback signal which is, in effect, the time estimated two-state coded waveform advanced by a specified time shift Δ. The other time shift comparison means is supplied with a second feedback signal which is the time estimated two-state coded waveform delayed by the same specified time shift Δ. The outputs of the time shift comparison means are pulse width modulated waveforms and one is subtracted from the other to produce an effective error signal which is a three-state waveform. The error signal is supplied to a digital integrating means, such as an up-down counter which produces one or the other of a pair of control signals when the integral of the three-state input signal exceeds preset limits in one or the other direction. Such control signals are supplied to an increment/decrement circuit which is responsive to a clock signal, the control signals from the counter either adding a clock pulse or subtracting a clock pulse thereto depending on which control signal is present. The output of the increment/decrement circuit then produces an intermediate signal which is supplied to appropriate counter and code generator circuitry which may be implemented, for example, in the form of a shift register with feedback. The overall system thereby provides a digital delay locked loop which permits the tracking of a two-state input signal for use in appropriate communication and ranging systems.

DESCRIPTION OF THE INVENTION

The invention can be described in more detail with the help of the accompanying drawing wherein FIG. 1 shows a block diagram of a typical system of the the prior art;

Figure 1:
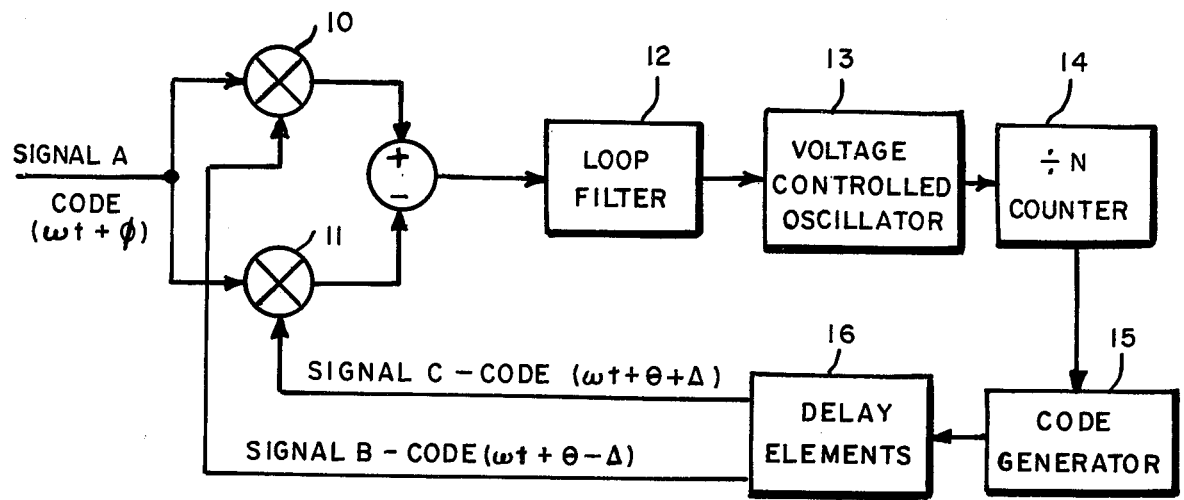

In order to understand the structure and operation of the invention, it is helpful to review a typical embodiment of a system of the prior art which uses analog techniques as shown in FIG. 1. Such figure depicts in block diagram a conventional delay-locked-loop of a type substantially similar to that described, for example, in the above-mentioned text of Lindsey and Simon.

As can be seen therein, a pair of multipliers 10 and 11 are used to correlate advanced and delayed code replicas, i.e., having the form: code($\omega t + \theta + \Delta$) and code($\omega t + \theta - \Delta$), respectively, identified as signals B and C, against the incoming code, i.e., of the form: code($\omega t + \phi$), identified as signal A. Each correlation is at a maximum when the code and the replica are exactly in synchronism, and decays monotonically to a small value as the waveforms become misaligned in either direction in time. Subtracting the result of correlation with the delayed replica from the result of correlation with the advanced replica provides an error signal which is zero when the on-time replica, i.e., code($\omega t + \theta$), is exactly in synchronism with the incoming code, i.e., code($\omega t + \phi$), (i.e., when $\theta = \phi$,) and which decreases or increases as $\theta$ increases or decreases, respectively, from $\phi$.

The loop filter 12, in FIG. 1, can be used for attenuating high-frequency components in the output of the two multipliers and for tailoring the dynamic response of the loop. Its output drives a voltage-controlled oscillator 13 so that its frequency increases if $\theta$ is less than $\phi$ and decreases if $\theta$ is greater than $\phi$. This operation of the voltage-controlled oscillator, acting through the $\div$N counter 14, code generator 15 and delay elements 16 which follow tends to drive $\theta$ into equality with $\phi$. The $\div$N counter 14 divides the frequency of the voltage-controlled oscillator 13 by N and provides for a digital readout of the time shift $\theta$, in a manner such as is described, for example, in U.S. Pat. No. 3,706,092, issued on Dec. 12, 1972 to D. Cox and K. Fertig. The code generator 15 takes the square wave at the output of the $\div$N counter 14 and converts it into a PRN code. Techniques for implementing the code generator are well known in the art as, for example, by the use of shift registers with feedback networks, as described in the above-mentioned text of Lindsey and Simon. The delay elements 16 following the code generator 15 are used for providing advanced, on-time, and delayed code replicas, i.e., code($\omega t + \theta + \Delta$), code ($\omega t + \theta$), and code($\omega t + \theta - \Delta$), respectively. Alternatively, shift registers can be generally employed also for providing the desired delays. The output of the code generator can be used directly as the advanced replica, code($\omega t + \theta + \Delta$).

Generally, the received coded waveform, i.e., signal A, will have been somewhat distorted by the transmission medium so that its tops and bottoms will not be flat and its transitions will not be sharp. The correlations are performed directly on the received coded waveform by means of high-speed analog switches, such that the input waveform is multiplied by +1 or −1, depending upon which of two states the particular replica code is in at any specific instant. The subtractions of the outputs of the two multipliers are performed with analog networks, such as operational amplifiers. The loop filter and voltage-controlled oscillator are usually analog elements of types commonly utilized in phase-locked loops.

In order to avoid the problems discussed above with respect to such prior art systems using analog techniques, this invention comprises an all digital approach to the time synchronization of PRN coded waveforms using digital delay locked loop techniques. One embodiment of the invention is described with reference to FIGS. 2 and 3.

As seen therein, an input two-state coded signal waveform identified as signal A is supplied to the input of a pair of time shift comparison means 20 and 21, which latter means may be implemented by exclusive-OR gate means or appropriate signal correlator means, well known to those in the art. Signal A may be of the form: code($\omega t + \phi$), as shown, and is a two-state waveform as shown by the corresponding signal waveform A in FIG. 3. Such signal represents a typical incoming two-state coded waveform of the type that would be utilized in the system of FIG. 2, as received directly or as obtained from a suitable threshold detector 22.

Figure 2:
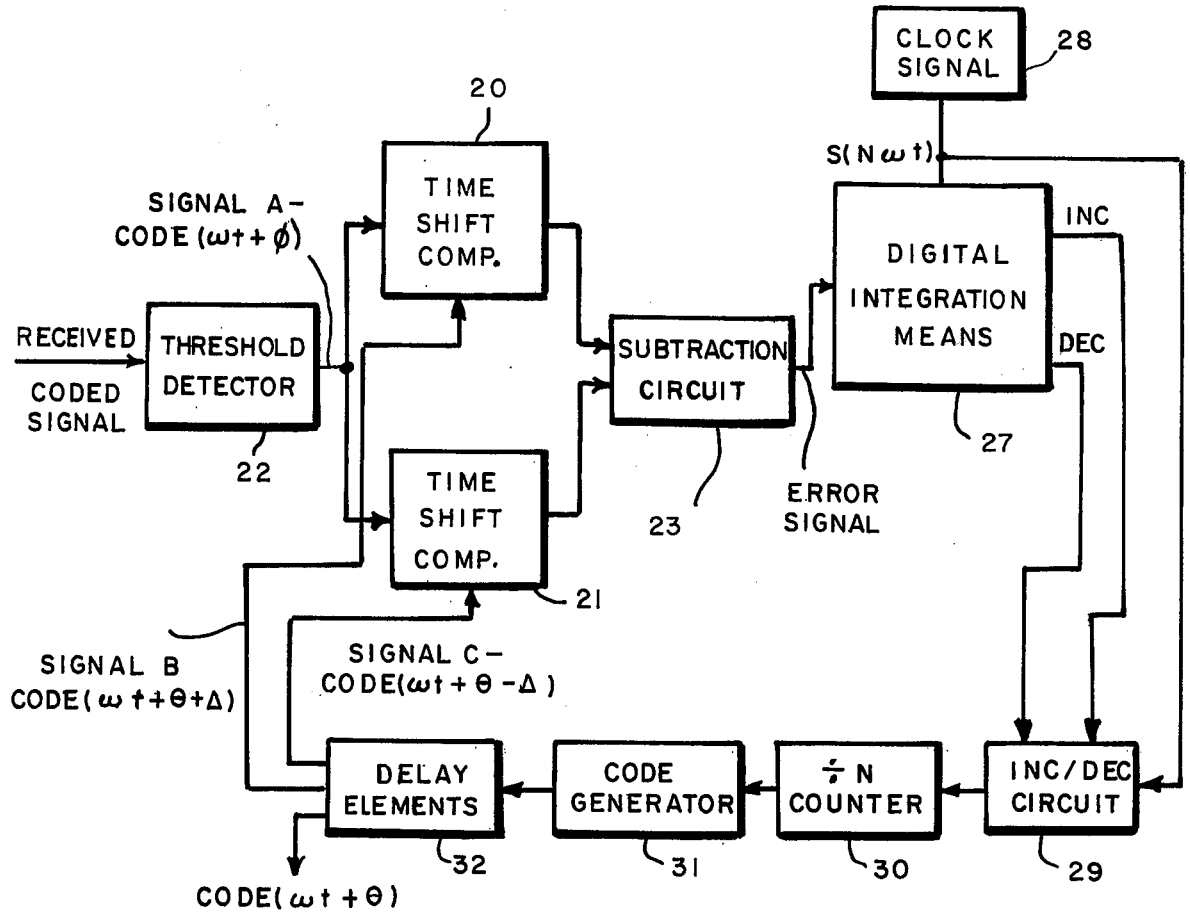
FIG. 2 shows a block diagram of a preferred embodiment of the invention.
Figure 3:
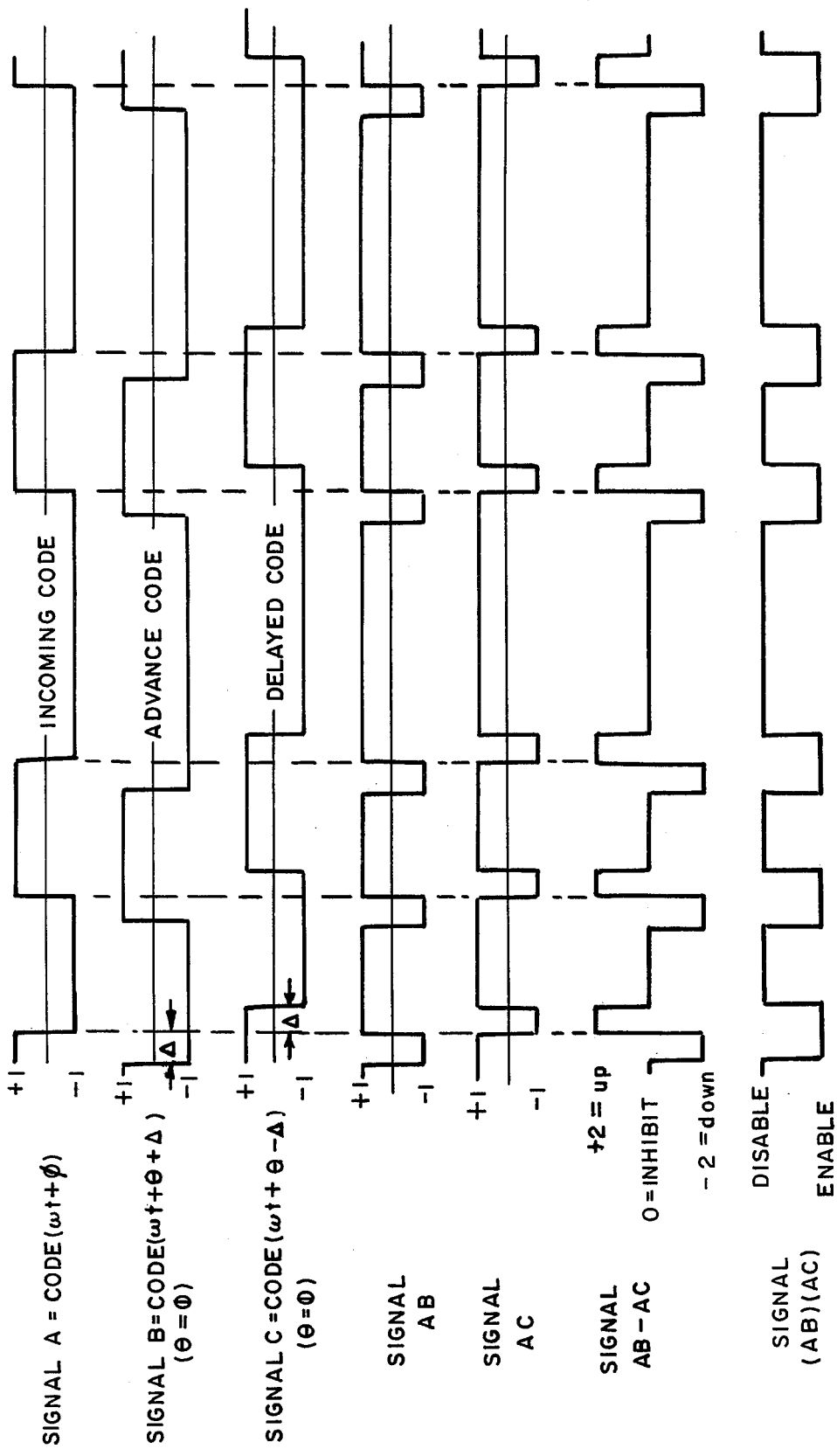
FIG. 3 shows a plurality of waveforms which are helpful in understanding the operation of the system of the invention.

Signal A is compared in time shift comparison means 20 and 21 with two signals identified in FIG. 2 as signal B and signal C each of which represents a time estimated coded waveform, signal B as shown in FIG. 3 being of the form: code($\omega t + \theta + \Delta$) which is the estimated advanced coded waveform and signal C of the form: code($\omega t + \theta - \Delta$) which is the estimated delayed coded waveform.

The output of time shift comparison means 20 is in effect the product of signal A and signal B, represented in FIG. 3 as signal AB and the output of time shift comparison means 21 is the product of signal A and signal C, represented in FIG. 3 as signal AC. Such signals are pulse-width-modulated waveforms. In FIG. 3 the time shift estimate $\theta = \omega t_{est}$ is assumed to be equal to the time shift $\phi = \omega t_s$ of the incoming coded waveform so that the average values of the product of signals A and B and the product of signals A and C would always be at their maximum values (i.e., +1) if it were not for the effect of the advancement and delay of the feedback waveforms by the time shift $\Delta$. The effect of the advance and time shift delay $\Delta$ on the product signals AB and AC is to produce values of −1 over intervals of length $\Delta$ as shown in FIG. 3.

The outputs of time shift comparison means 20 and 21 are then fed to an appropriate summing logic circuit 23 which, in effect, subtracts the signal AC from the signal AB to produce a pulse-width-modulated output error signal identified as signal (AB−AC), which signal is a three-state waveform as shown in FIG. 3. If $\theta = \phi$, that is, there is no time shift error between the estimated coded waveform and the incoming coded waveform, the average value of the signal (AB−AC) is zero, indicating that there is no time error. If the incoming coded waveform alters its time shift $\phi$ while the value $\theta$ of the estimated coded waveform remains fixed, the rising edges of the portions of the waveform (AB−AC) having a total length of +2 will be moved proportionately depending on whether $\phi$ is greater than or less than $\theta$ so that the overall signal waveform (AB−AC) assumes a non-zero average value. Thus signal waveform (AB−AC) acts as an error signal.

Thus, the error signal at any one time assumes one of a plurality of different values such that the time average of such error signal represents the time difference between the average time shift of the signals B and C and the time shift of the input signal.

Such error signal is supplied to a digital integration means 27 which, using a clock signal of frequency ($N\omega t$) from clock source 28, digitally integrates the error signal and produces a first one of a pair of control signals when the integral of the error signal exceeds a predetermined positive value, and produces a second one of a pair of control signals when the integral of the error signal exceeds a predetermined negative value. One of said control signals is designated in FIG. 2 as an "Increment" control signal and the other as a "Decrement" control signal, such signals being supplied to an increment/decrement logic circuit 29, as shown. One method of implementing the digital integration means 27 is with a digital up-down counter, although other methods may be utilized within the skill of the art within the scope of the invention. The use of up-down counter means for similar digital integration purposes in a different context is disclosed, for example, in copending U.S. Pat. application, Ser. No. 512,733, filed Oct. 7, 1974 by Duncan B. Cox, Jr. and William H. Lee. An alternative scheme for digital integration and the production of such control signals in a different context is also discussed in U.S. Pat. No. 3,936,762, issued on Feb. 3, 1976 to D. Cox and W. Lee.

Thus, when $\phi$ is less than $\theta$, the error signal is non-zero in a direction such that the average value thereof is negative which produces a decrement signal at the output of counter 27. When $\phi$ is greater than $\theta$, the average value of the error signal is positive and an increment signal is produced at the output of counter 27.

In the specific embodiment shown, the increment-/decrement circuit 28 is supplied with a clock signal having the same frequency, ($N\omega t$), as that supplied to the digital integration means 27. When an increment signal is applied thereto an additional clock pulse is added to the clock signal and when a decrement signal is applied thereto a pulse is deleted from the clock signal. When no increment or decrement signal is applied thereto the signal output therefrom is the same as the clock signal input.

The output of the increment/decrement circuit is supplied to a $\div N$ counter 30 the output thereof being supplied to a code generator circuit 31 and thence to delay elements 32, as described above, to supply the time estimated signal code($\omega t + \theta$) and the delayed and advanced time estimated signals code($\omega t + \theta + \Delta$) and code($\omega t + \theta - \Delta$) for time-shift comparison with the incoming coded signal at the time-shift comparison means.

Figure 5:
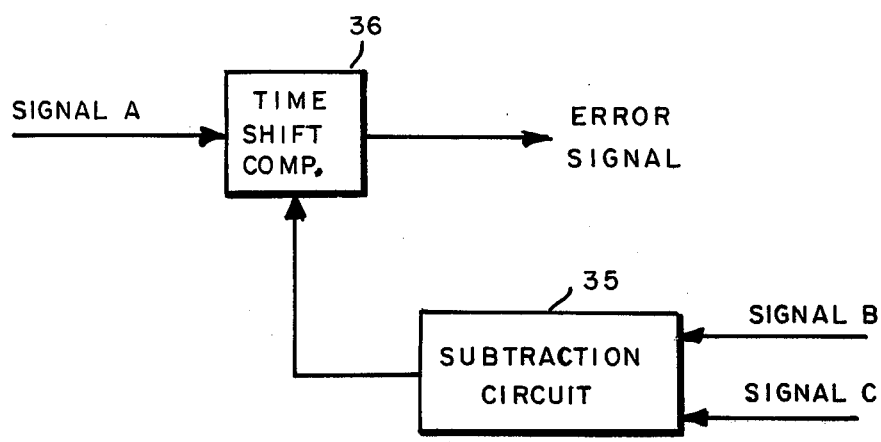
FIG. 5 shows a block diagram of an alternative embodiment of a portion of the system shown in FIG. 2

While the error signal in FIG. 2 is shown as produced by providing a time-shift comparison between the input coded signal and the coded feedback signals and subtracting the comparison signals, an alternative approach, as shown in FIG. 5, can be used. As seen in FIG. 5 the coded feedback signals B and C can be subtracted initially in subtraction circuit 35 and the time shift of the output thereof compared with that of the input signal A at time-shift comparison means 36. The error signal therefrom is then supplied to the digital integration means, as before.

Figure 4:
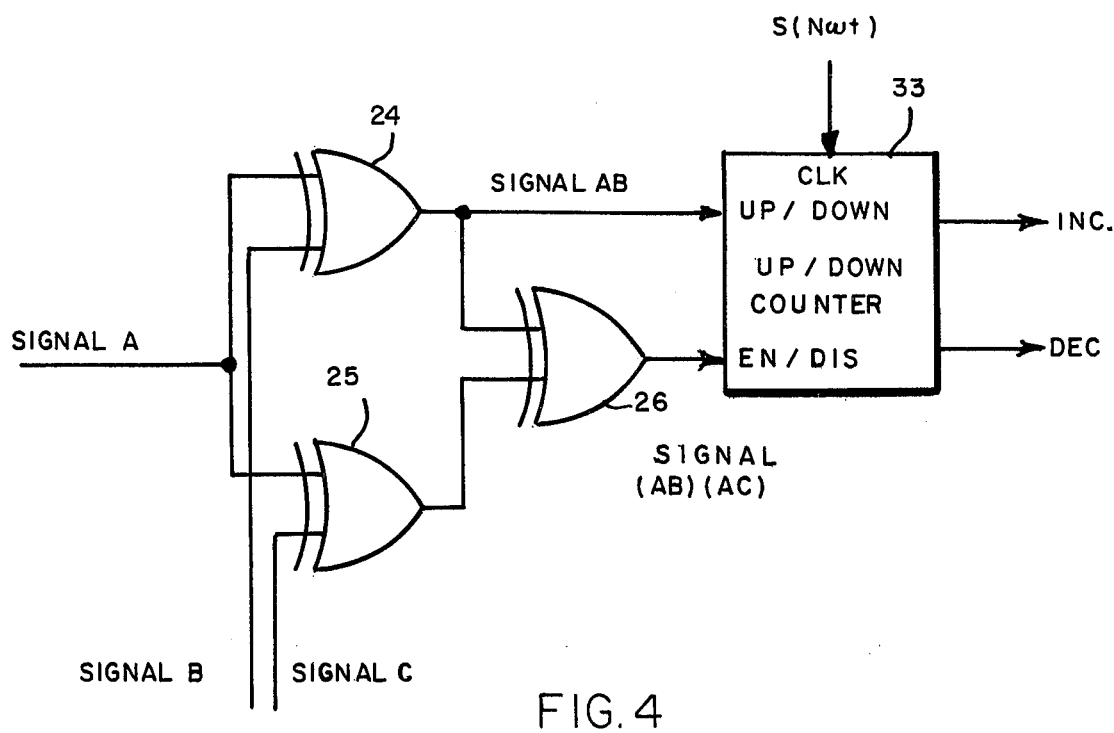
FIG. 4 shows a block diagram of an embodiment of a portion of the system shown in FIG. 2.

A specific technique for implementing the error signal generating means and the digital integration means of FIG. 2 is shown, for example, in FIG. 4. Thus, the time-shift comparison means 20 and 21 are depicted as exclusive-OR elements 24 and 25, respectively. The outputs thereof effectively represent the signals (AB) and (AC), respectively, such signals being thereupon supplied to the inputs of an exclusive-OR element 26 as shown. The digital integration is performed by an up-down counter 33 having an enable/disable input, an up-down count input, and a clock input, as shown.

The output of exclusive-OR element 26 is supplied to the enable/disable input of counter 33 and the output of exclusive-OR element 24 is supplied to the up-down input thereof, the counter also being supplied at its clock input by the clock signal from clock source 28, the frequency of which, ($N\omega t$), is an integral multiple of the frequency $\omega t$ of the input coded signal.

The signal waveforms at the output of exclusive-OR element 24 (signal AB) and at the output of exclusive-OR element 26, in effect signal (AB) (AC), contain substantially the information contained in signal (AB−AC) of FIG. 2 and can be used to supply the counter inputs for performing the digital integration operation. Thus, the up-down counter 33 counts up when the signal AB is positive and counts down when such signal is negative, so long as the signal (AB) (AC) is in its enabling state, the counter 33 counting the high frequency pulses at its input clock wave form signal $S(N\omega t)$. The counter does not count when the signal (AB) (AC) is in its disabling state. In effect, then, counter 33 with the inputs shown provide what is equivalent to a digital integration of the error signal as discussed with reference to FIG. 2.

While the clock signal frequencies at the up-down counter and at the increment/decrement circuit are shown as the same, in some applications they may differ, the frequency at the counter being ($M\omega t$) and the frequency at the increment/decrement circuit being ($N\omega t$), for example. Other modifications of the invention may occur to those in the art within the scope and spirit of the invention and the invention is not to be limited to the specific embodiment described herein except as defined by the appended claims.

What is claimed is:

1. A system for processing an input pseudo-random-noise coded signal comprising a time-shift error sensing means responsive to said input pseudo-random-noise coded signal and to first and second pseudo-random-noise coded feedback signals having first and second time shifts, respectively, said first and second pseudo-random-noise coded feedback signals having an average time shift which is the average of said first and second time shifts, said error sensing means producing an error signal which is proportional to the time difference between said average time shift and the time shift of said input signal and which at any instant of time assumes one of a plurality of different values such that the time average of said error signal represents said time difference;

means responsive to said error signal for digitally integrating said error signal and for generating a control signal which is a function of said digitally integrated error signal;

means responsive to said control signal and to a pulsed clock signal for controllably changing the number of pulses in said pulsed clock signal to produce an intermediate signal having a controlled pulse rate; and means responsive to said intermediate signal for producing said first and second pseudo-random-noise coded feedback signals and for producing a third pseudo-random-noise coded signal which is driven toward time synchronism with said input coded signal.

2. A system in accordance with claim 1, wherein said digital integrating means is a digital counter means.

3. A system in accordance with claim 2 wherein said time-shift error sensing means comprises a first time-shift comparison means responsive to said input coded signal and to said first coded feedback signal for producing a first comparison signal representing the time shift therebetween;

a second time-shift comparison means responsive to said input signal and to said second coded feedback signal for producing a second comparison signal representing the time shift therebetween; and means for combining said first and second comparison signals to produce said error signal.

4. A system in accordance with claim 2 wherein said time-shift error sensing means comprises means for combining said first coded feedback signal and said second coded feedback signal to produce a combined coded signal;

time-shift comparison means responsive to said input coded signal and to said combined coded signal for producing a comparison signal representing the time shift therebetween, said comparison signal being said error signal.

5. A system in accordance with claim 3 wherein said digital counter means is an up-down counter.

6. A system in accordance with claim 5 wherein said first and second time-shift comparison means are first and second exclusive-OR elements, respectively.

7. A system in accordance with claim 6 wherein said combining means is a third exclusive-OR element;

said up-down counter means having an up-down count input and an enable-disable input, the signal from said first exclusive-OR element being supplied to said up-down count input and the signal from said third exclusive-OR element being supplied to said enable-disable input.

8. A system in accordance with claim 1 and further including a threshold detector for providing said input coded signal.

9. A system in accordance with claim 1 wherein said coded feedback signal producing means includes a dividing counter means for dividing the pulse rate of said intermediate signal by an integral factor selected to produce the frequency of the input coded signal.

10. A system in accordance with claim 1 wherein said means for producing said first and second pseudo-random-noise coded feedback signals includes means for producing a first digital waveform; and means for producing a second digital waveform identical with said first digital waveform but shifted in time with respect thereto, said first and second digital waveforms respectively providing said first and second pseudo-random-noise coded feedback signals.

11. A system in accordance with claim 10 wherein said first and second digital waveforms are pseudo-random-noise codes identical with the pseudo-random-noise code by which said input signal is coded.

12. A system in accordance with claim 11 wherein said digital integrating means is a digital up-down counter means.

13. A system in accordance with claim 12 and further including a clock for providing a clock signal having a frequency higher by a first integral factor than the frequency of said pseudo-random-noise code of said first and second digital waveforms, said clock signal being provided to increment and decrement said up-down counter means.

14. A system in accordance with claim 13 wherein said coded feedback signal producing means includes a dividing counter means for dividing the pulse rate of said intermediate signal by a second integral factor selected to produce the frequency of said input coded signal.

15. A system in accordance with claim 14 wherein said first and second integral factors are the same.

* * * * *